United States Patent
Singh et al.

(10) Patent No.: US 11,893,536 B2
(45) Date of Patent: Feb. 6, 2024

(54) BUSINESS TO BUSINESS SOFTWARE CONNECTIONS

(71) Applicants: Deepak Singh, Aurora, IL (US); Sunil Hans, Noida (IN); Mange Ram Tyagi, Indirapuram Ghaziabad (IN)

(72) Inventors: Deepak Singh, Aurora, IL (US); Sunil Hans, Noida (IN); Mange Ram Tyagi, Indirapuram Ghaziabad (IN)

(73) Assignee: ADEPTIA, INC., Chicago, IL (US)

( * ) Notice: Subject to any disclaimer, the term of this patent is extended or adjusted under 35 U.S.C. 154(b) by 153 days.

(21) Appl. No.: 14/557,742

(22) Filed: Dec. 2, 2014

(65) Prior Publication Data
US 2016/0156517 A1    Jun. 2, 2016

(51) Int. Cl.
| | |
|---|---|
| G06F 15/16 | (2006.01) |
| G06F 7/00 | (2006.01) |
| G06Q 10/10 | (2023.01) |
| G06F 9/54 | (2006.01) |
| H04L 67/565 | (2022.01) |

(52) U.S. Cl.
CPC ............. *G06Q 10/10* (2013.01); *G06F 9/541* (2013.01); *H04L 67/565* (2022.05)

(58) Field of Classification Search
CPC .................. G06Q 30/06; G06Q 10/10; G06F 2009/45562; G06F 2009/45595; H04L 12/66; H04L 67/10; H04L 67/1097; H04L 67/16; H04L 67/20; H04L 67/28; H04L 67/2823; H04L 67/34; H04L 67/38; H04L 12/46; H04L 67/565; H04L 69/16

See application file for complete search history.

(56) References Cited

U.S. PATENT DOCUMENTS

| | | | |
|---|---|---|---|
| 6,993,585 B1 * | 1/2006 | Starkovich | H04L 67/2823 709/223 |
| 8,504,609 B2 | 8/2013 | Mansoor et al. | |
| 8,595,344 B2 | 11/2013 | Bhatt et al. | |
| 8,612,300 B2 | 12/2013 | Tung et al. | |
| 8,661,132 B2 | 2/2014 | Dorai et al. | |
| 2002/0002579 A1 * | 1/2002 | Holden | G06Q 30/02 709/200 |

(Continued)

FOREIGN PATENT DOCUMENTS

CN    103235727    8/2013

OTHER PUBLICATIONS

"Axway Community Management (ACM)", Axway; http://www.axway.com/products-solutions/cloud-solutions/axway-community-management, Search-2-Innovate, LLC, Docket No. 2014NOV+009_00435; Apr. 4, 2014; p. 14.

(Continued)

*Primary Examiner* — Nicholas R Taylor
*Assistant Examiner* — Ho T Shiu
(74) *Attorney, Agent, or Firm* — Clark Hill PLC; John S. Paniaguas

(57) ABSTRACT

A Software-as-a-Service (SaaS) system for providing a social network for business to business (B2B) electronic connectivity is disclosed and more particularly to a simplified B2B electronic connectivity interface which not only facilitates one-to-one business connections but can also be used to facilitate one business to many business connections while maintaining point-to-point connections between each company with each of its trading partners.

9 Claims, 24 Drawing Sheets

(56) References Cited

U.S. PATENT DOCUMENTS

| | | | | |
|---|---|---|---|---|
| 2006/0253860 | A1* | 11/2006 | Hoerle | H04L 67/2823 |
| | | | | 719/328 |
| 2007/0100961 | A1* | 5/2007 | Moore | G06F 9/5072 |
| | | | | 709/217 |
| 2007/0239858 | A1* | 10/2007 | Banerji | G06Q 30/06 |
| | | | | 709/220 |
| 2008/0071887 | A1* | 3/2008 | Gaurav | G06F 16/88 |
| | | | | 709/220 |
| 2010/0042720 | A1* | 2/2010 | Stienhans | G06F 9/5072 |
| | | | | 709/226 |
| 2010/0082689 | A1* | 4/2010 | Wargin | G06Q 40/08 |
| | | | | 707/791 |
| 2012/0036065 | A1 | 2/2012 | Orttung et al. | |
| 2012/0109772 | A1 | 5/2012 | Chernenko et al. | |
| 2012/0284036 | A1* | 11/2012 | Evans | G06Q 30/0241 |
| | | | | 707/812 |
| 2012/0324069 | A1 | 12/2012 | Nori et al. | |
| 2013/0227103 | A1* | 8/2013 | Garimella | H04L 41/5054 |
| | | | | 709/223 |
| 2013/0290690 | A1 | 10/2013 | Nucci et al. | |
| 2016/0094363 | A1* | 3/2016 | Ravi | G06F 21/57 |
| | | | | 370/401 |

OTHER PUBLICATIONS

"Cloud Integration—EDI and API?", Rajeev Gupta; Mar. 5, 2010, http://blogs.mydbsync.com/cloud-integration-edi-and-api/, Search-2-Innovate, LLC, Docket No. 2014NOV+009_00435; Apr. 4, 2014; p. 15.

"Crossgate is SAI's Answer to EDI and B2B Requirements", Kevin Benedict; Aug. 4, 2009, http://b2b-bpo.blogsport.com/2009/08/crossgate-is-saps-anseer-to-edi-and-b2b.html Search-2-Innovate, LLC, Docket No. 2014NOV+009_00435; Apr. 4, 2014; p. 16.

"How to Reach for Cloud Without Disrupting Business", Chris McNabb; Feb. 18, 2014, http://www.informationweek.com/cloud/platform-as-a-service/how-to-reach-for-cloud-without-disrupting-business/d/d-id/1113858 Search-2-Innovate, LLC, Docket No. 2014NOV+009_00435; Apr. 4, 2014; p. 17.

* cited by examiner

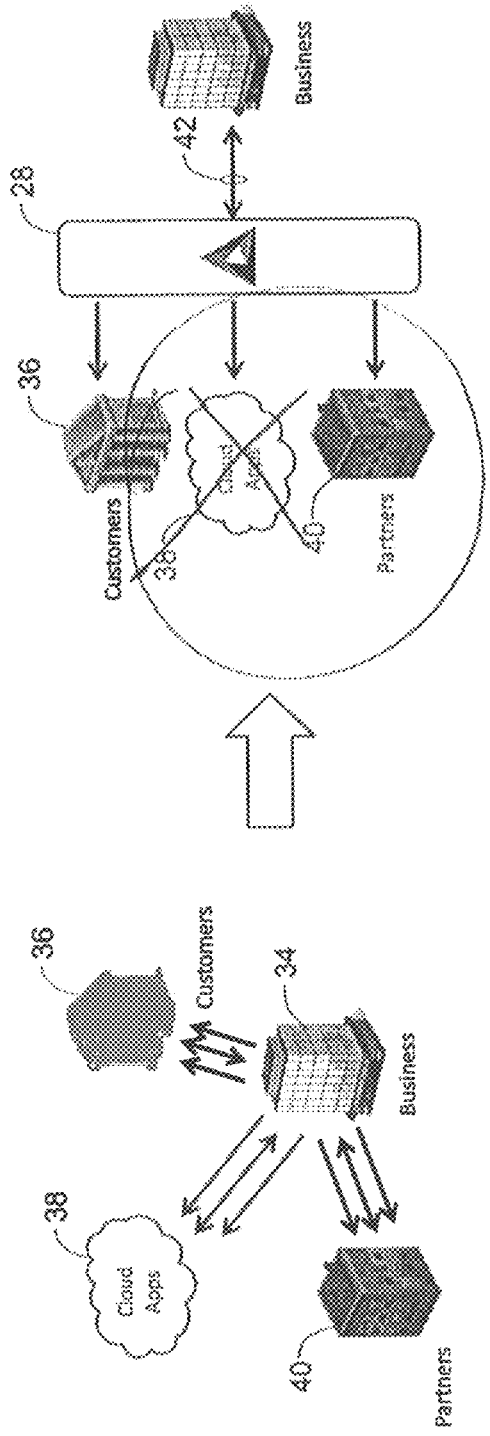

Fig. 8

Configuring Adapter: Step 1 - Definition

Fig. 9

Configuring Connection: Step 1 - Definition

Fig. 19

Configuring Connection: Step 3 – Destination
Pre-filled from Company A adapter

Hi, John
AccuProcess

Dashboard  Connections  Adapters  Network

BACK | Create New Connection

Definition  >  Source  >  Destination  >  Field Mapping

Cancel | Save | Next

Destination Configuration

Adapter Name     Salesforce Accounts —— 232
Company Name     Adeptia Inc. —— 234
Overview         This will load new Accounts into SalesForce from files companies send. —— 236

Cancel | Save | Next —— 238

BUSINESS TO BUSINESS SOFTWARE CONNECTIONS

BACKGROUND OF THE INVENTION

1. Field of the Invention

The present invention relates to a Software-as-a-Service (SaaS) system for providing a social network type approach for business to business (B2B) electronic connectivity and more particularly to a simplified B2B electronic connectivity interface which not only facilitates one-to-one business connections but can also be used to facilitate one business to many business connections while maintaining point-to-point connections between each company with each of its trading partners.

2. Description of the Prior Art

In order to increase business to business communications, many companies communicate electronically. In some businesses, for example, business involved vertical supply chains, establishing the electronic communications can be quite cumbersome. In some situations, it is known to take months to establish point to point electronic connectivity between two (2) businesses. In addition, the connectivity for multiple files between the retailer and each vendor may need to be configured.

FIG. 1 illustrates four (4) exemplary methods that may be used in configuring business to business connectivity, as follows:

- An incoming file 20 used by the vendor for receiving purchase orders in EDI, receiving purchase orders in XML or receiving new leads in CSV, for example.
- An outgoing file 22 used by the vendor to send invoices to a retailer in XML, send shipping notice in EDI, or send price quotes in Excel, for example.
- Web service messages 24 used to update account information, check order status, or get a price list, for example.
- A web-based form user interface 26 used to place a new delivery order, check payment status or update billing status, for example.

In order to establish business to business electronic connectivity, the connectivity parameters between the two companies need to be compatible. These parameters include:

Data protocol
Data format
File sizes
Notifications

For businesses involved in vertical supply chains, it is necessary to establish electronic connectivity between all of the trading partners and the company. As illustrated in FIG. 2, a large vertical supply chain company, such as Wal-Mart®, may have 1000 trading partners. For each connection and each file, electronic connectivity must be established.

FIG. 3 illustrates a typical application for establishing electronic connectivity between a trading partner and a company. Considering each trading partner as a spoke and the company as a hub, a company such as Wal-Mart® may have 1000 spokes. Moreover, each trading partner may need to establish electronic connectivity for multiple files, as discussed above.

As such, establishing electronic connectivity between all of the trading partners and a company is a difficult and time consuming task requiring technical engineers to implement these connections. Typically, the trading partners have limited technical ability. As such, oftentimes the process of establishing electronic connectivity between a trading partner and a company is handled manually and can take months.

Thus, there is a need to simplify the process of establishing electronic connectivity between two businesses.

SUMMARY OF THE INVENTION

Briefly, the present invention relates to a Software-as-a-Service (SaaS) system for establishing an interface to facilitate business to business (B2B) electronic connectivity connections and more particularly to an interface which not only facilitates one-to-one B2B connections but can also be used to facilitate one business to many business connections while maintaining point-to-point connections between each company and each of its trading partners. In accordance with one aspect of the invention, the electronic connectivity interface includes "adapters" for each subscribing business. These adapters may be published in a directory. Other businesses can be invited to build connections to the published adapters thus providing a social network approach to B2B connectivity. In accordance with another aspect of the invention, businesses with incompatible connectivity parameters can connect with another business by simply connecting to the interface. In this scenario, a conversion feature included in the interface is able to convert certain incompatible connectivity parameters from one business to be compatible with a target business and establish a connection between the two businesses. The interface acts as a digital switch and establishes connections between an initiating business and a partner company and monitors the data traffic in each connection.

DESCRIPTION OF THE DRAWINGS

These and other advantages of the present invention will be readily understood with reference to the following specification and attached drawing wherein:

FIG. 5 is a simplified diagram illustrating the difference between the current system and the system in accordance with the present invention in which a single connection need only be managed.

FIGS. 8-12 illustrate a form for configuring an adapter

Figure 23:
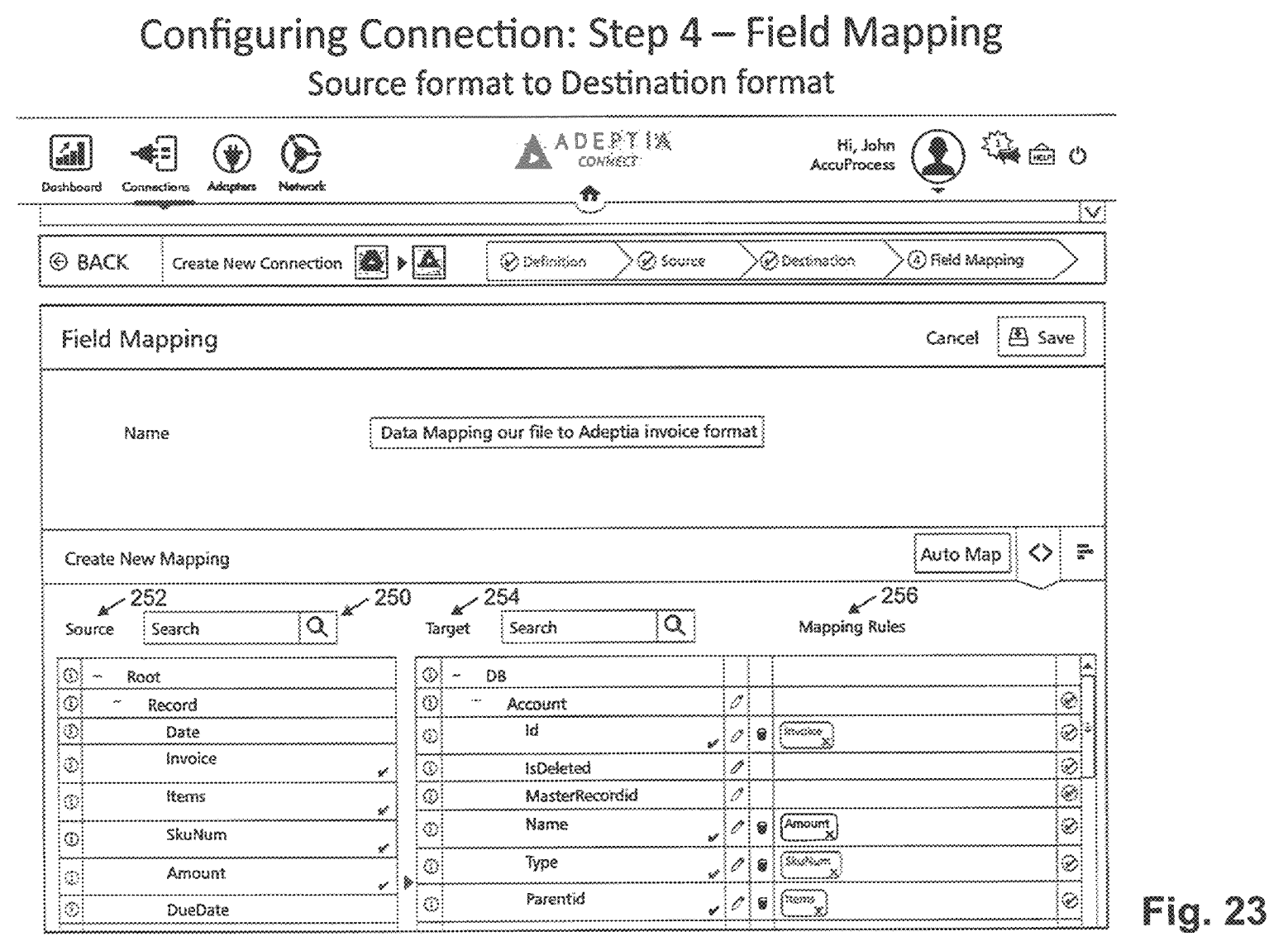

FIGS. 18-23 illustrate the process for connecting to a third party adapter in the adapter directory.

DETAILED DESCRIPTION

The present invention relates to a Software-as-a-Service (SaaS) system for establishing an interface to facilitate business to business (B2B) electronic connectivity connections which not only facilitates one-to-one B2B connections but can also be used to facilitate one to many business connections while maintaining point-to-point connections between each company and each of its trading partners. In accordance with one aspect of the invention, the electronic connectivity interface includes "adapters" for each subscribing business. These adapters may be published in a directory. Other businesses can be invited to build connections to the published adapters thus providing a social media approach to B2B connectivity. In accordance with another aspect of the invention, businesses with incompatible connectivity parameters can connect with another business by simply connecting to the interface. In this scenario, a conversion feature included in the interface is able to convert certain incompatible connectivity parameters from one business to be compatible with a target business and establish a connection between the two businesses. The interface acts as a digital switch and establishes connections between an initiating business and a target and monitors the data traffic in each connection.

There are other benefits of the invention. For example, as will be discussed below, the need for technical engineers to establish B2B connections is no longer necessary. Connections to businesses are can be made by non-technical personnel. In addition, a large vertical supply chain company need only establish and maintain a single connection for all of its trading partners using the social network approach of the present invention.

Figure 1:
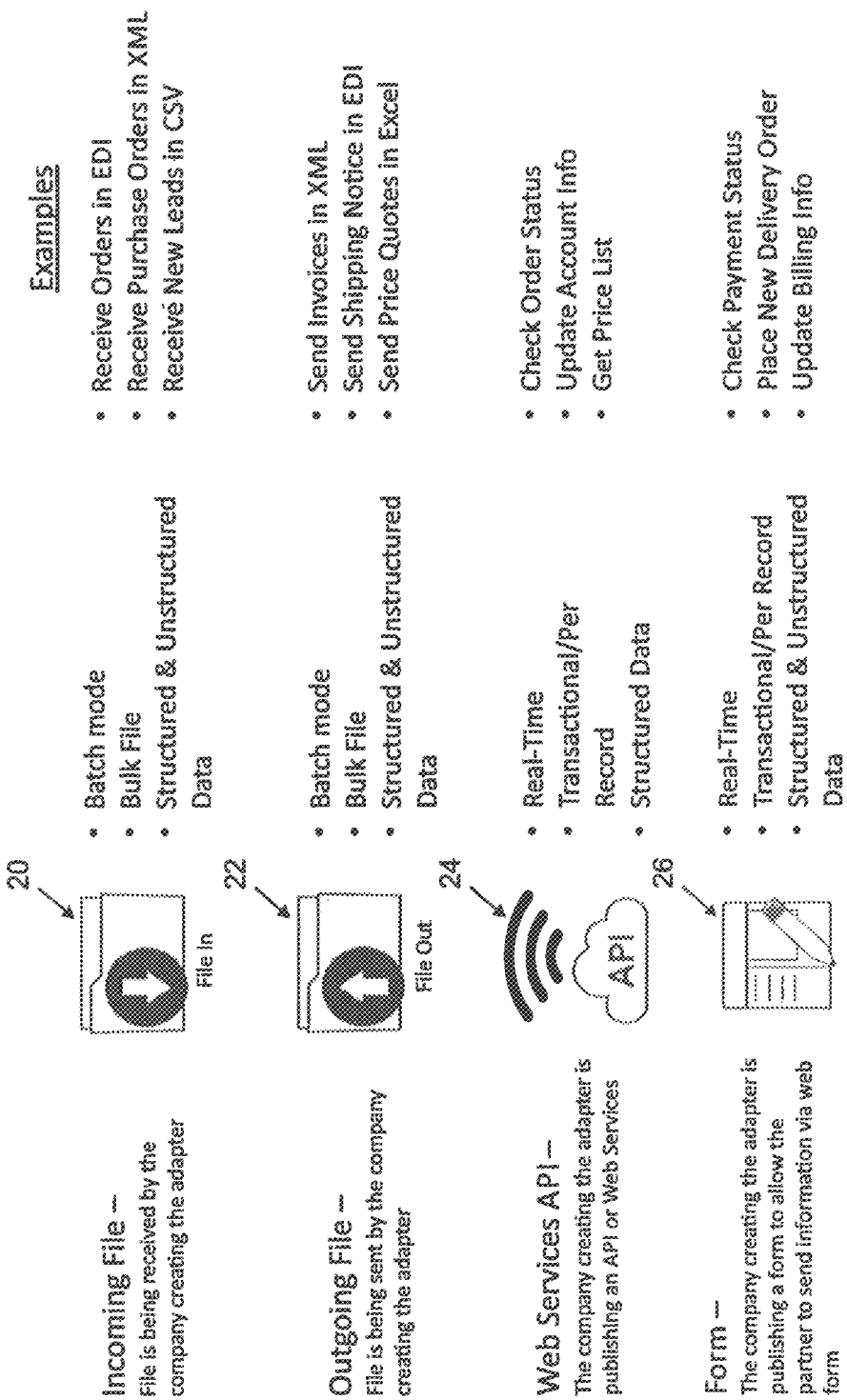
FIG. 1 illustrates various types of electronic files that may be used in business to business communications.
Figure 2:
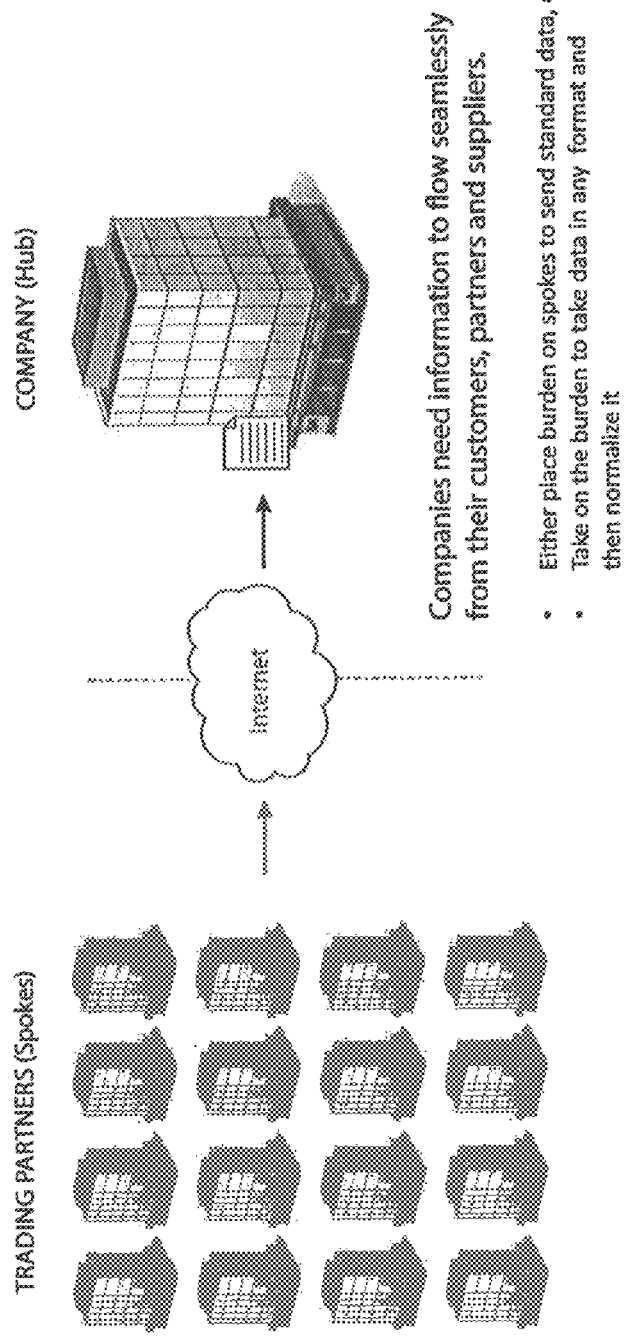
FIG. 2 is a simplified diagram illustrating multiple trading partners communicating with a single company.
Figure 3:
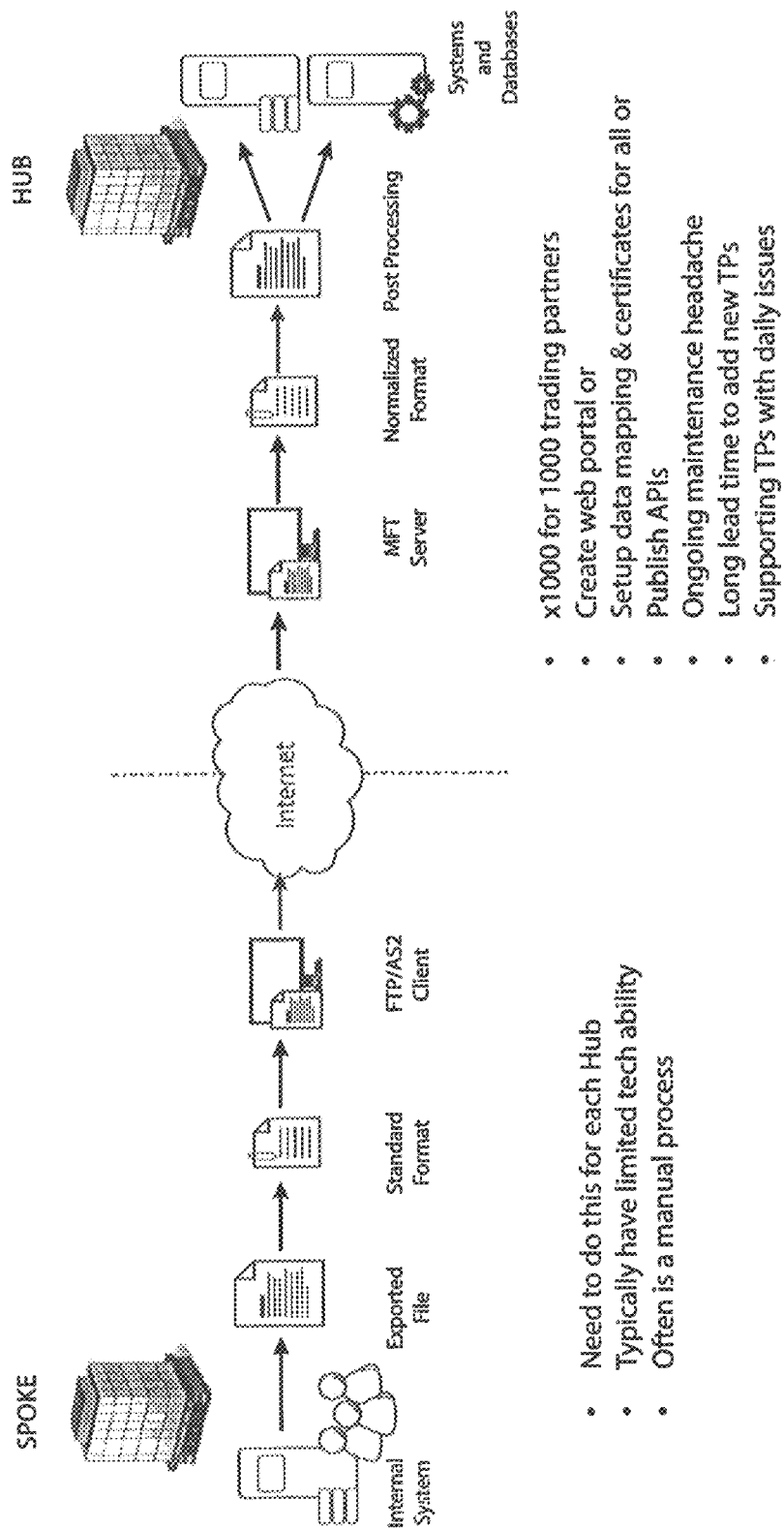
FIG. 3 is a connectivity diagram of a single trading partner and the company.
Figure 4:
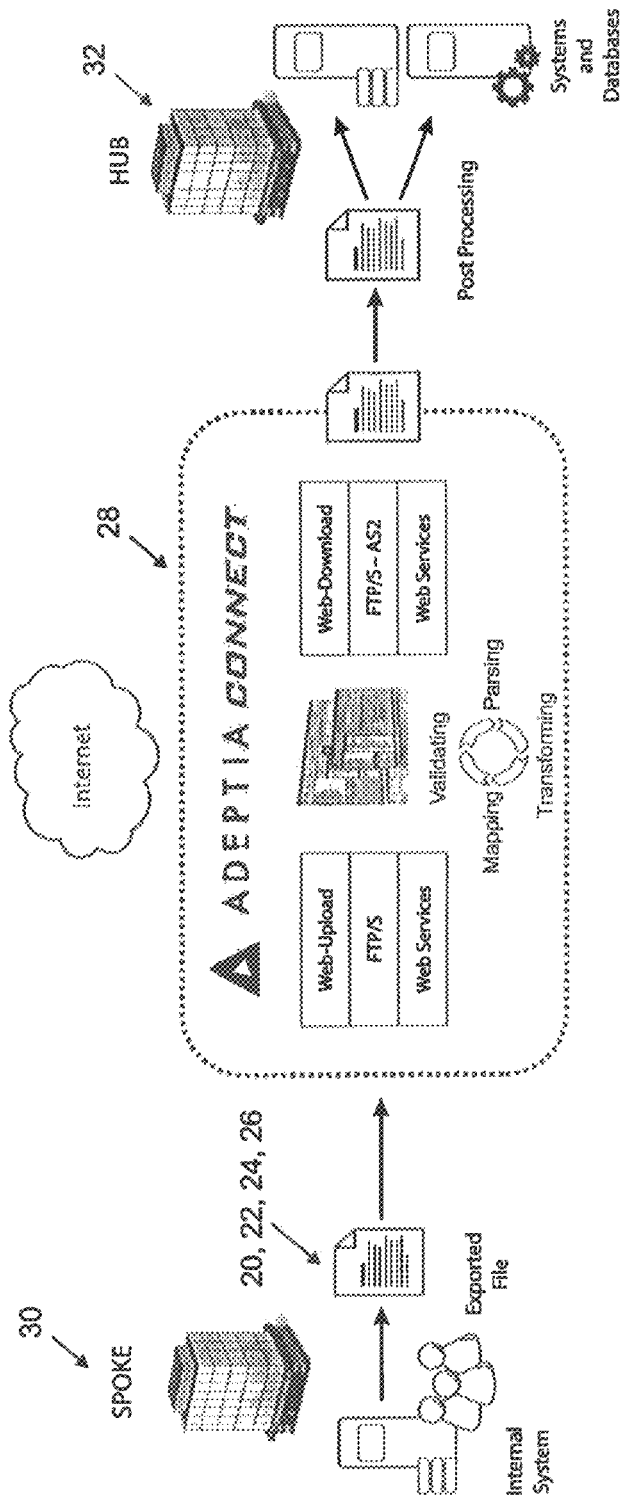
FIG. 4 is a connectivity diagram of a single trading partner and the company using the business to business electronic connectivity connection system in accordance with the invention.

Referring to FIG. 4, the system in accordance with the present invention is a SaaS which functions as an interface 28 between a spoke 30, i.e. trading partner, and a hub 32, a company. The interface 28 may be a web based system residing in the "cloud". In this system, the spoke 30 need to export a file, such as the files 20, 22, 24 and 26 (FIG. 1) to the interface 28 by way of a web portal. The interface 28 connects business to the hub 32 using an adapter suitable for the connection. As will be discussed in more detail below, the spoke 30 exporting the file 20, 22, 24 and 26 will be connected to the target hub 28 if the electronic connectivity parameters of the spoke 28 are compatible with adapter of the target hub 32. The file 20, 22, 24 and 26 is then downloaded to hub 32 by way of web services that reside in the interface 28.

As will be discussed in more detail below, one aspect of the invention is that the interface 28 can be used to maintain a common directory of all adapters for different business that subscribe to the interface. As such, a business can check the directory to find an adapter for a target business of interest. Since each adapter identifies all of the electronic connection parameters for the target company of interest. the initiating business can easily and quickly determine the electronic connection parameters for the file(s) to be sent to the target business. If the electronic connection parameters of the file are compatible with the target business of interest, a connection can be made through the interface 28 to the target business or hub 32 so that the file can be transferred. Alternatively, as will be discussed below, the interface 28, as will be discussed below, can convert a file with incompatible electronic connection parameters to a file with compatible parameters so that the file can be transferred to the hub 32.

Referring to FIG. 5, the interface significantly simplifies management of B2B connections. As shown, in known systems, a business needs to set up and manage connections with various targets, such as customers 36, or partners 40, for example. In such a situation, electronic connectivity needs to be set up for each connection. As shown, there are several connections for each of the various targets. One feature of the interface 28 is that one connection 42 can be maintained by the business 42 to the interface 28. In this case the interface 28 maintains the connections to the various targets, i.e. customers 36, and partners 40. In this way, the way, an adapter for the business 42 is established on the interface and the targets manage their side of the connection to the adapter of the business 42. In this way, the business, for example, Wal-Mart® manages few adapters only instead of thousands of connections.

Figure 6A:
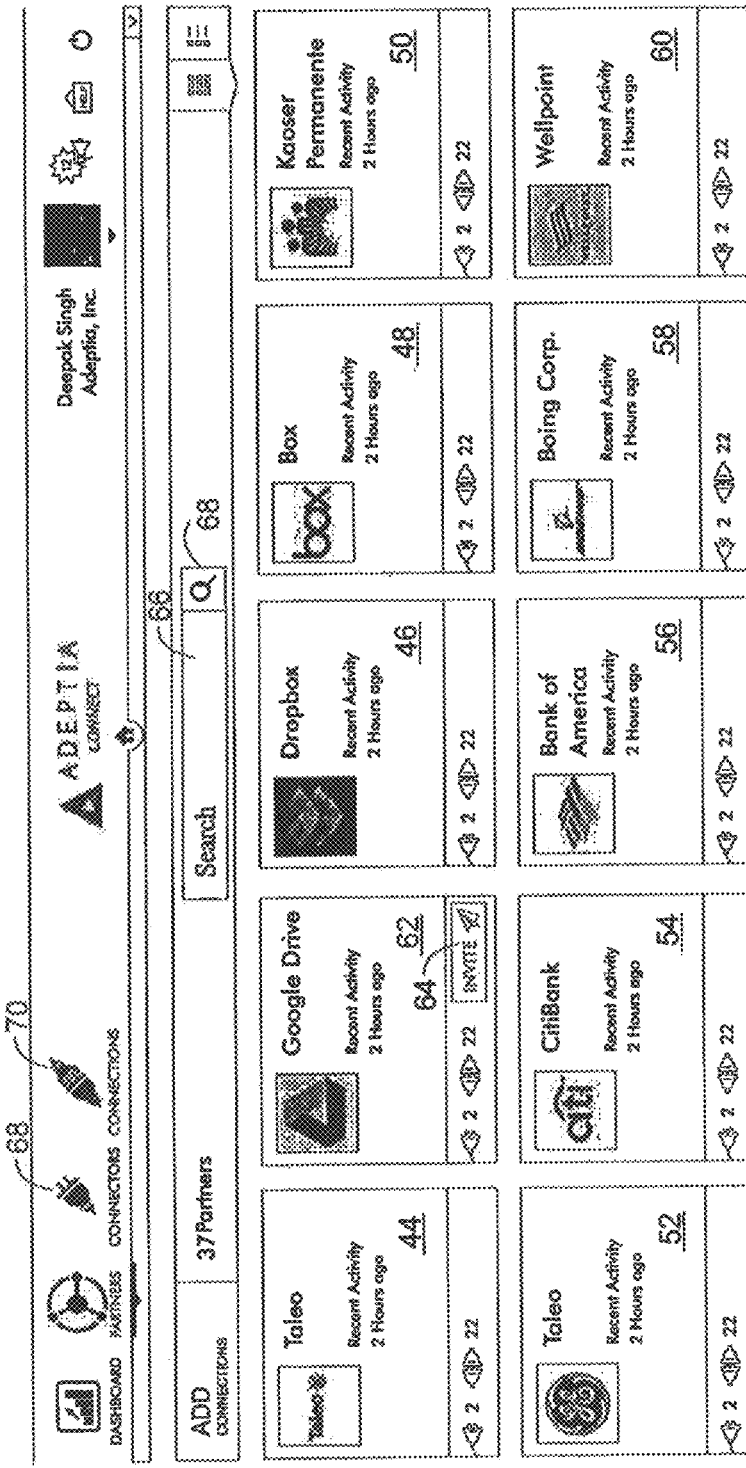
FIG. 6A is an exemplary view illustrating all of the adapters of target companies connected to a single business.

FIG. 6A is an exemplary view illustrating all of the adapters of target companies connected to a single business. In essence, FIG. 6 is an exemplary dashboard for a single business. All of the current partners shown and illustrated by the boxes 44 and 52-60. These exemplary partners are shown to include Taleo, Kaiser Permanente, General Electric, CitiBank, Bank of America, Boeing Corporation and WellPoint. The boxes 46 and 48 relate to current cloud applications; Dropbox and Box. The box 62 relates to an invited cloud application; namely Google Drive. As shown, a number of adapters that are part of the interface 28 are illustrated. In particular, indications of ten adapters are shown in boxes identified with the reference numerals 44-62. Each box 44-62 illustrates the number of connections per adapter 44-62 as well as an indication of recent activity. In particular, the icon 68 indicates the number of adapters with each partner while the icon 70 indicates the number of connections per partner. The number of adapters relates to the number of adapters for each partner for the various file types discussed above. The number of connections relates to the total number of connections for one business partner which includes the current connection and other connections with third parties.

The box 62 illustrates an "invite" button 64. As will be discussed in more detail below, the invite button 64 is a social media approach to connectivity. In particular, the invite button 64 invites the target to make a connection. If the target accepts, Google Drive will be connected to the business.

As mentioned above the interface 28 includes a directory of adapters. The dashboard includes a search feature which includes a search box 66 and a search button 68. Thus, available adapters in the adapter directory can be searched. Once a target adapter indication is located, it is displayed on the dashboard with an invite button 64. Once the invite button 64 is selected the target has the ability to accept or decline the invitation, similar to social media.

Figure 6B:
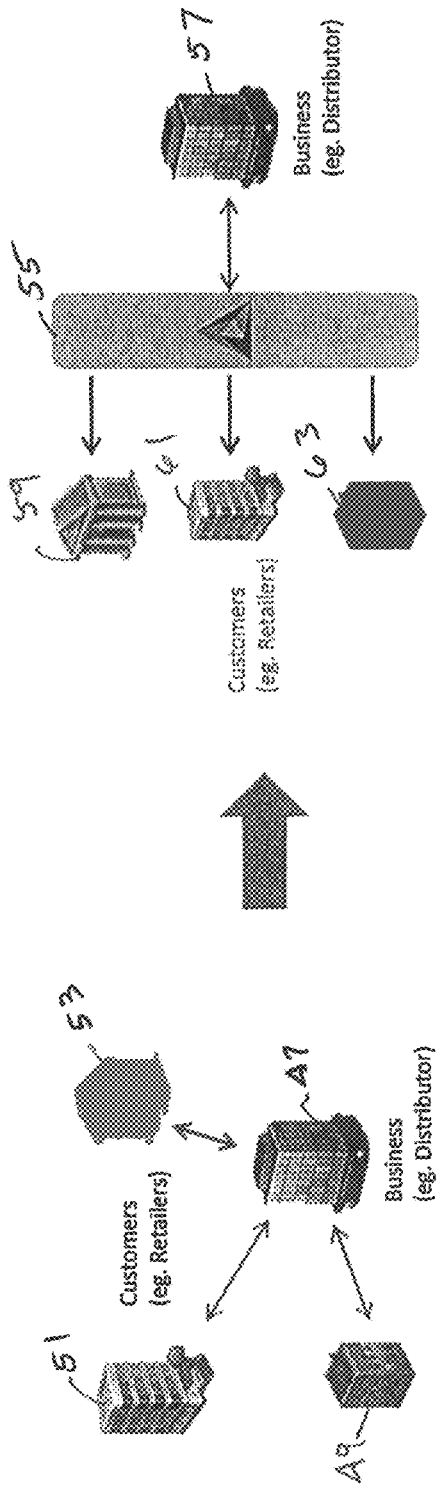
FIG. 6B is an exemplary simplified view illustrating the one to many social network approach to B2B business communications.

FIG. 6B is a simplified view of the process. As shown on the left hand side of FIG. 6B, a business 47 using the current system would need to establish and maintain a connection with each of its partners 49, 51 and 53. Thus, if a distributor wanted to send out a catalogue and price list to hundreds of customers, the distributor would need to establish connections with the hundreds of customers.

The system on the right side of FIG. 6B illustrates the system in accordance with the invention. As mentioned above, this system uses a social networking approach to business connections. Like social networking where one message can be sent out by one to many recipients, the system in accordance with the present invention uses the same approach with respect to connections. In particular, a business 57 can provide its connection parameters to the interface 55 to be available to all of its trading partners 59, 61 and 63. In this way, the company 57 need only establish and maintain a single connection to the interface 55. The trading partners 59, 61 and 63 maintain single connections to the interface 55. Thus, in the example above, the distributor would only need to provide one connection to the interface to send out hundreds of copies of a catalog and price list.

In one embodiment of the invention, a user can control all connections, as illustrated in FIGS. 5 and 6A. More specifically, with reference to FIG. 6A, all connections can be managed from the dashboard. As mentioned above, the interface acts as digital switch and makes connections between two businesses. New connections can be requested by way of the invite feature discussed above. Connections can be deleted by selecting the connections icon 70 on the dashboard.

Figure 7:
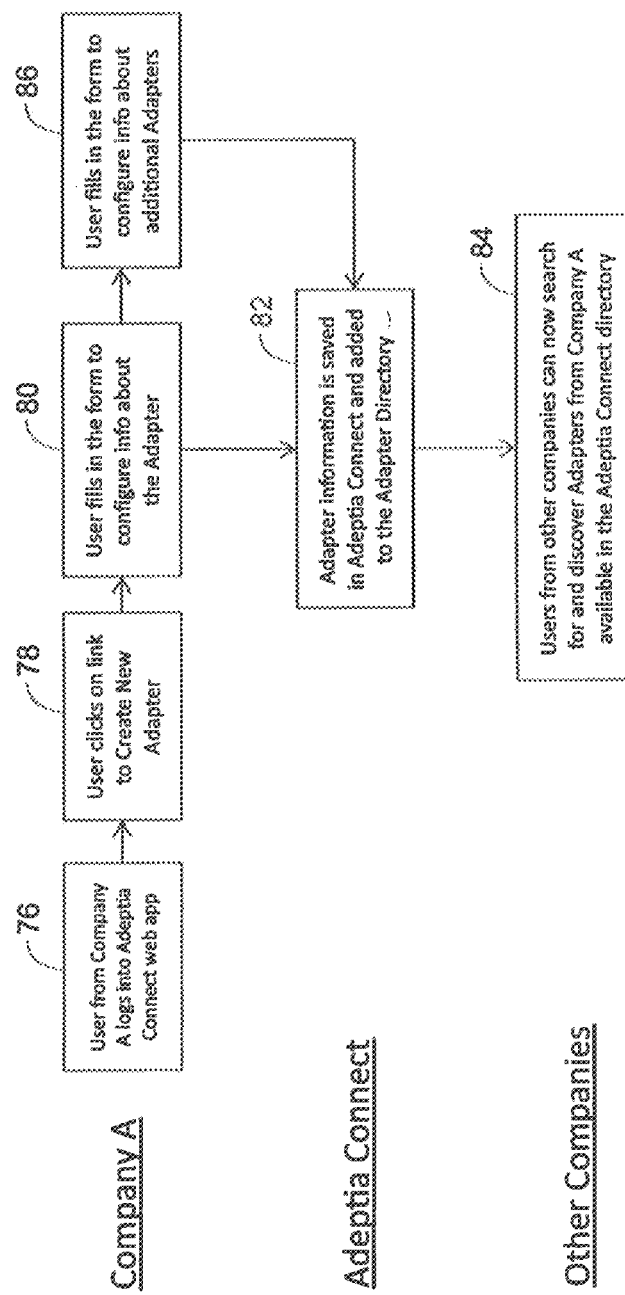
FIG. 7 is a process flow diagram for creating a new adapter.
Figure 8:
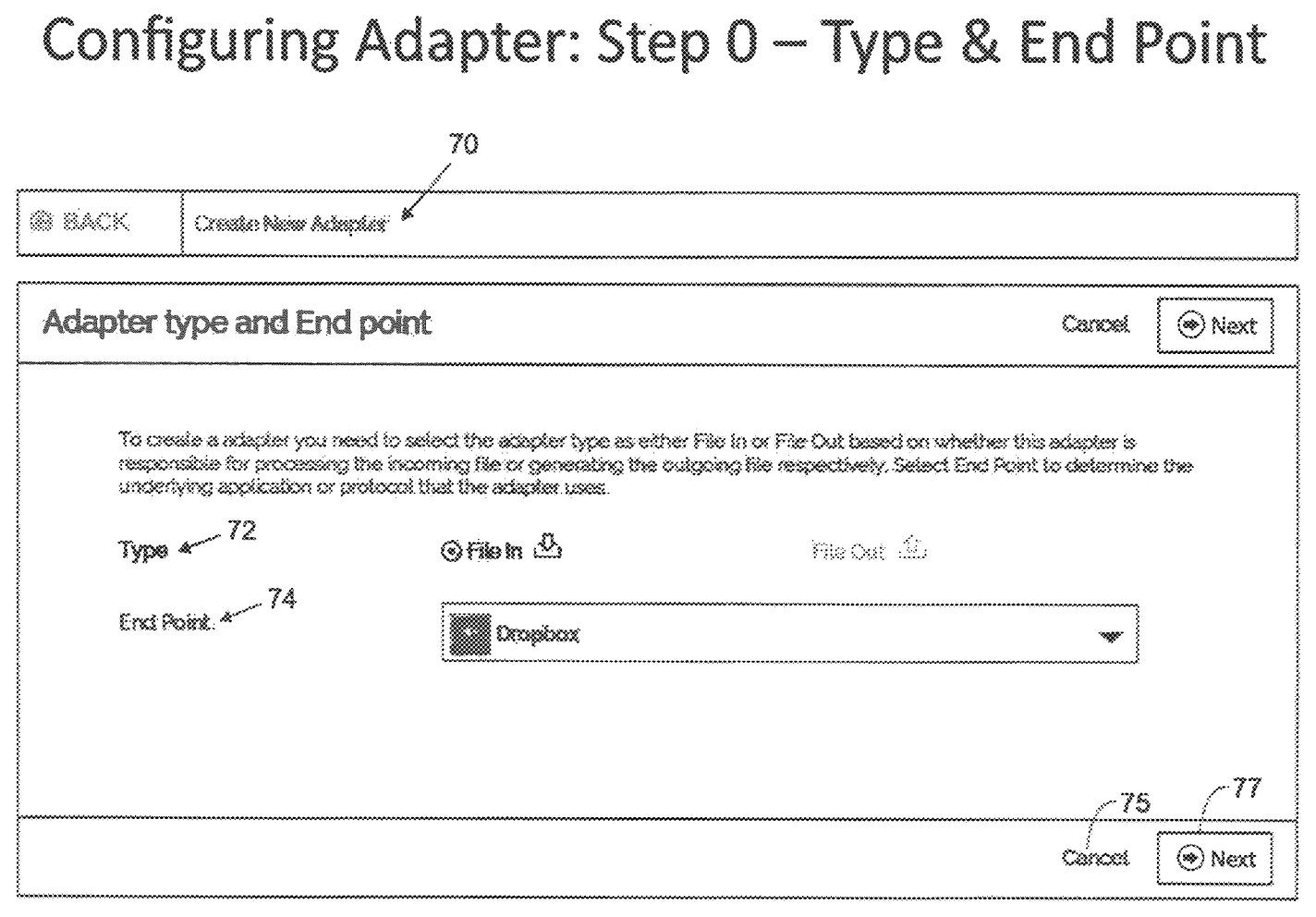

FIGS. 7-12 illustrate the process of creating a new adapter. As mentioned above, the interface is web based. Referring first to FIG. 7, a process flow diagram for creating a new adapter is illustrated. In step 76, in order to create a new adapter, the user logs into a connect web application, for example, as illustrated in FIG. 8. Next in step 78, the user selects a "Create New Adapter" button. In step 80, the user fills in all of the required information for the form, as discussed below in connection with FIGS. 8-12. The adapter information is saved by the interface 28 (FIG. 4) and added to the directory as mentioned above. In step 84, users from other companies, i.e. source companies, can now search for and discover the adapters for Company A, i.e. target company in the adapter directory. In step 86, Company A can repeat steps 78 to 82 to configure additional adapters.

FIGS. 8-12 illustrate the form for configuring an adapter, as discussed above. The form is spread over the web pages illustrated in FIGS. 8-12. Referring first to FIG. 8, an exemplary web page is illustrated in FIG. 8. This web page includes the "Create New Adapter" button 70; a Type box 72 and an end point box 74. The Type box 72 refers to whether the file is a "file in" or a "file out". The endpoint box 74 relates to the endpoint account, i.e., the destination to which the file is to be delivered. In order to configure an adapter, the user begins by selecting the "Create New Adapter" button 70. Next, various pieces of information regarding the adapter is filled in. Specifically, the file type box 72 is filled in. The file type box is used to specify whether is "file in" or "file out". Next the endpoint destination of the file is inserted in the box 74. Additional information is required as indicated in FIGS. 9-12 When the information required by FIG. 8 is filled in, the user has the option to cancel the information by selecting a "Cancel" button" 75 or selecting a "Next button" 77.

Figure 9:
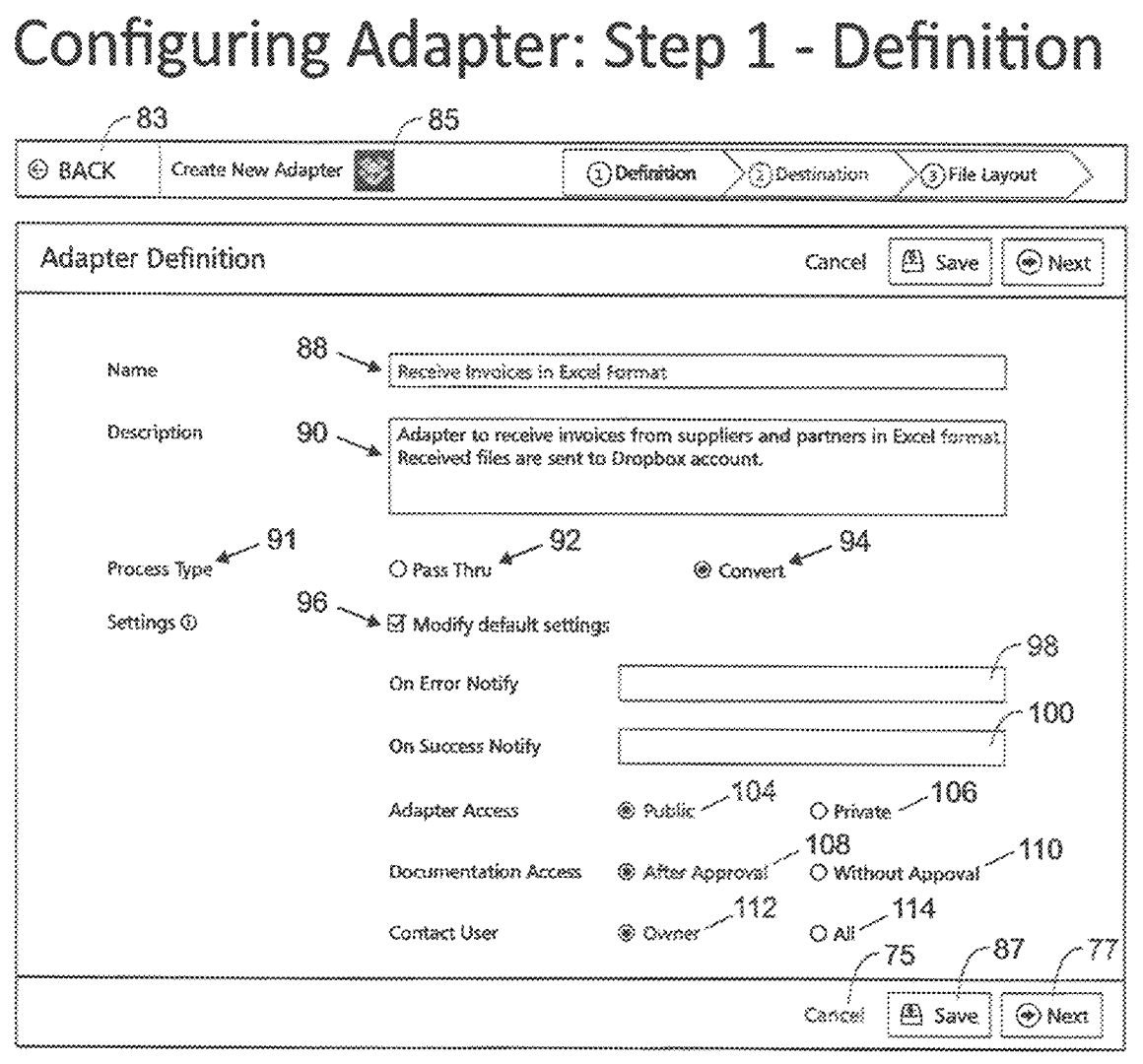

Assuming the user selects the next button 77, a web page, as illustrated in FIG. 9 appears. This web page relates to the definition of the adapter. This page requires several pieces of information relating to the definition of the adapter. Specifically, the adapter name and description is required in the text boxes 88 and 90. In the example illustrated in FIG. 9, the name is identified as "Receive invoices in Excel format". The exemplary description is identified as: "Adapter to receive invoices from suppliers and partners in Excel format. Received files are sent to Dropbox account". The user must also identify the process type 91 by selecting "Pass Thru" 92 or "Convert" 94. The Pass Thru option causes the file to simply be passed through "as is" from the source to the destination. The convert option indicates that the file is to be processed and the file format converted.

Various settings for the adapter must also be specified. Certain default settings may be incorporated into the interface 28 (FIG. 4). If so, a check box 96 is provided to allow the user to modify the default settings. These settings relate generally to notifications and access. Each of these settings may be selected by clicking on the desired setting. Two exemplary notification settings are shown: "On Error Notify" and an "on Success Notify". These settings relate notifications to be sent to Company B of action by Company The email address of the party to be notified is written in the text box 98 or 100. The adapter access 102 must also be specified. The adapter access may be selected as "Public" or "Private" by selecting one of the radio buttons 104 or 106. Public Access allows the adapter to be available to external companies. With Private Access, the adapter is only available for internal use and is not visible in the adapter directory. The radio buttons 108-114 relate to documentation access. Depending on whether documentation access with approval or without approval, one of the radio buttons 108 or 110 is selected. The radio buttons 112 and 114 allow the user to be contacted for connection approval or if there are any problems.

After the configuration information is filled in on the page illustrated in FIG. 9, the user has several exemplary options. One option is to save the information on the page by selecting the button 87 and moving on to the next web page by selecting the Next button 77. Another option is to cancel the information on the page by selecting the button 75. The user can scroll back to the previous page by selecting the "Back" button 83. Lastly, the user can select a "Create New Adapter" button 85 and start all over.

Figure 10:
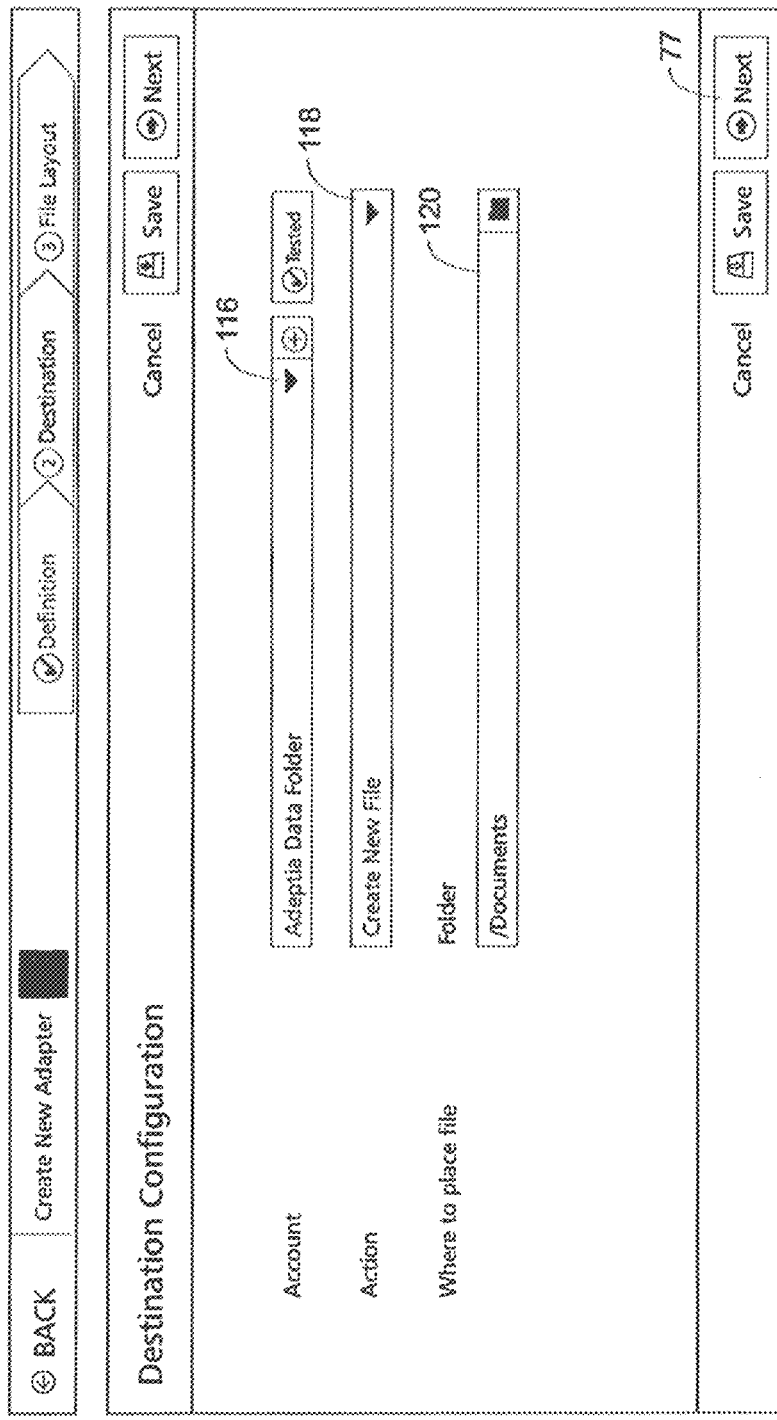

Assuming the user selected the "Next" button 77, the web page illustrated in FIG. 10 is displayed. This web page relates to the file destination. This web page includes three text boxes. The first text box 116 relates to the endpoint account, such as Dropbox. The second text box relates to the action to be taken in other words, what to do with the arriving file, for example, create a new file. The third text box 120 relates to the folder in which the file is to be placed.

Figure 11:
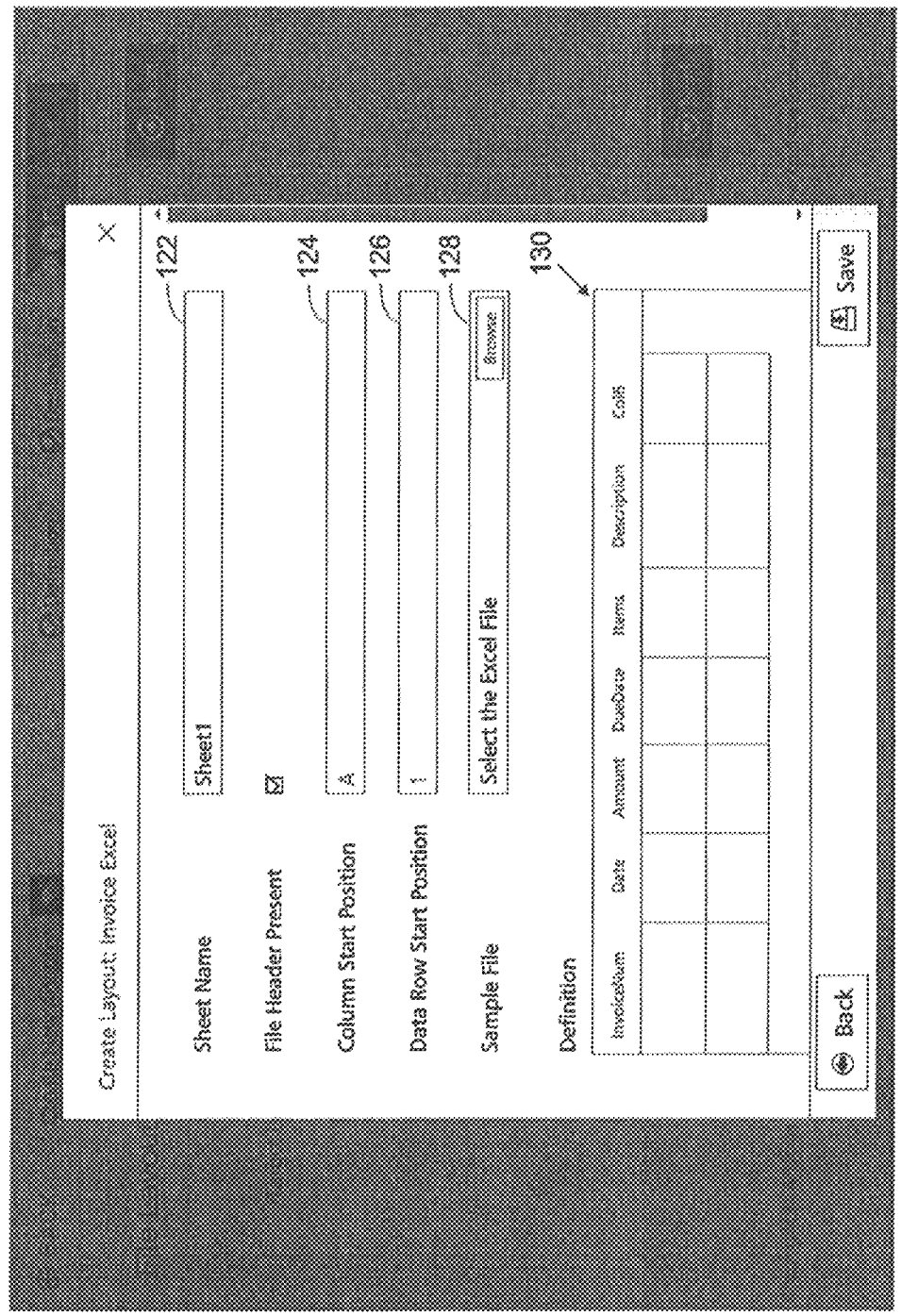

After the web page illustrated in FIG. 10 is completed, the user has the same options as discussed above. Assuming the user selects the "Next" button 77, the web page illustrated in FIG. 11 is displayed. However, the web page illustrated in FIG. 11 is only displayed when the "Convert" button 94 is selected on the web page illustrated in FIG. 9. This page is used to select the file layout of the converted file and includes several text boxes 122-128. The text box 128 relates to the. file format, for example Text, Excel, XML, Fixed length, etc. The text boxes. The text boxes 122,124 and 126 relate to the file format. The text boxes identified with the reference numeral 130 allow the field names to be selected.

Figure 12:
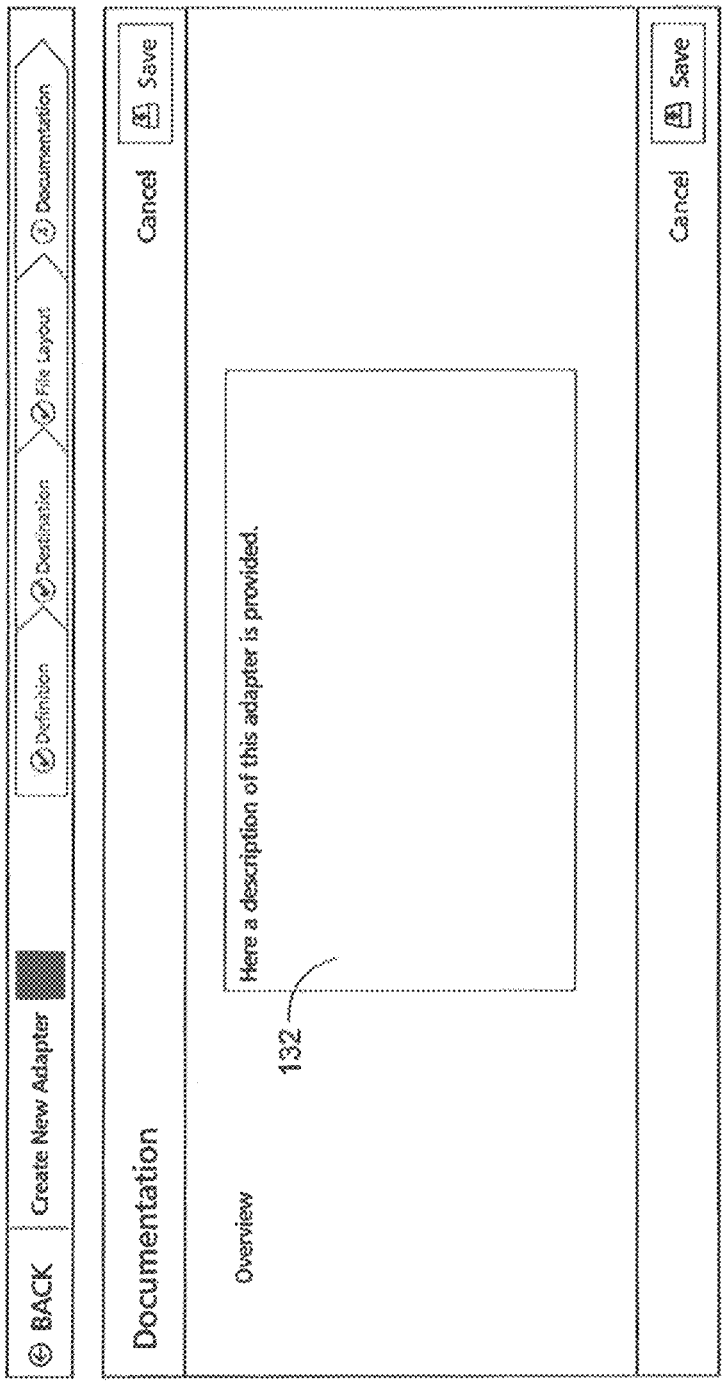

The final web page involved in creating an adapter is illustrated in FIG. 12 and relates to documentation. The documentation relates to information to be given to other parties that may wish to connect with the company to which the adapter pertains. This web page includes a single text box which can be used to provide an overview of the adapter.

Figure 13:
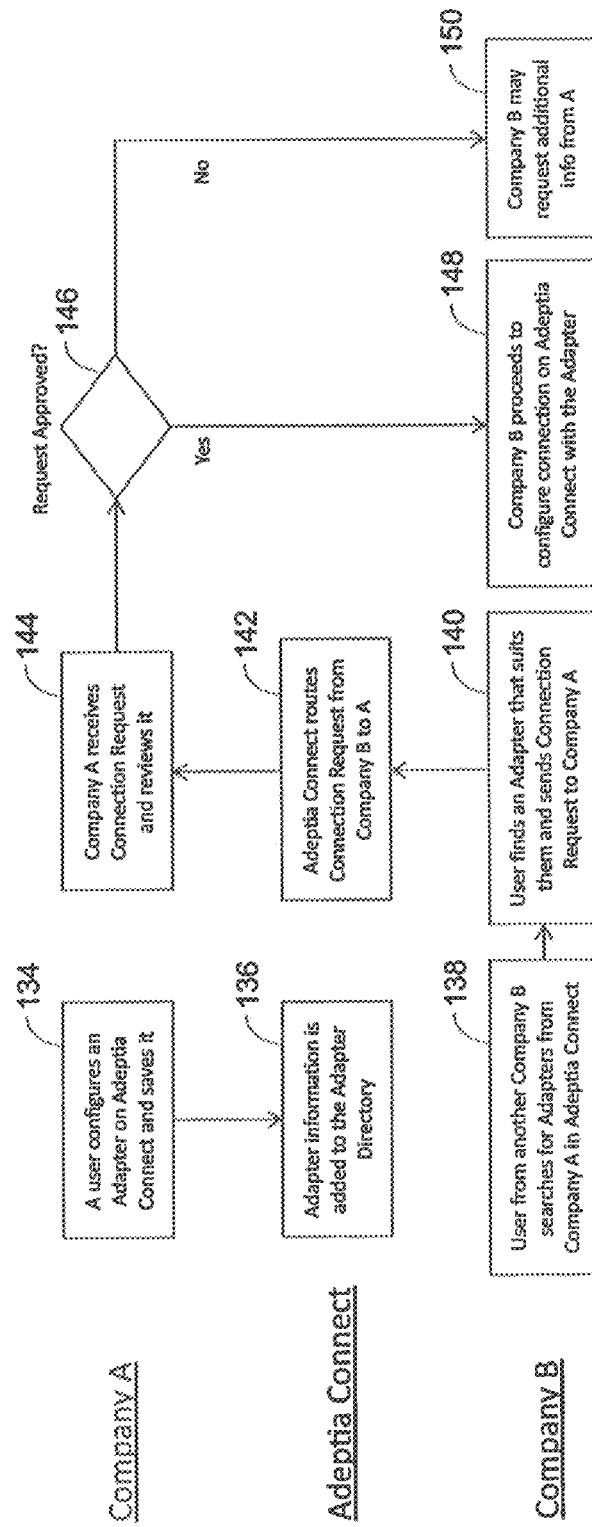
FIG. 13 illustrates a process flow for requesting connectivity with a third party using a social network approach.

FIG. 13 illustrates a process flow for requesting connectivity with a third party using a social network approach. FIGS. 14-17 illustrate exemplary web pages illustrating a social network approach to requesting connectivity with a third party.

Referring first to FIG. 13, assume that a user from Company A configures an adapter and stores it in the interface 28, as indicated by the box 134. As mentioned above adapters are stored and listed in an adapter directory, as indicated by the box 136. In this example, a user from Company B searches the adapter directory and locates the adapter for Company A in the directory and sends a request to be connected to Company A, as indicated in the box 140. The request for a connection is routed to Company A, as indicated by the box 142. The request is received by Company A, as indicated by the box 144. Similar to social media, Company has the right to approve or deny the request, as indicated by the decision block. If the request is approved, as indicated by the block 148, Company B can then proceed to configure a connection to Company A's adapter. If the request is not approved, as indicated by the block 150, Company B may request additional information from Company A.

Figure 14:
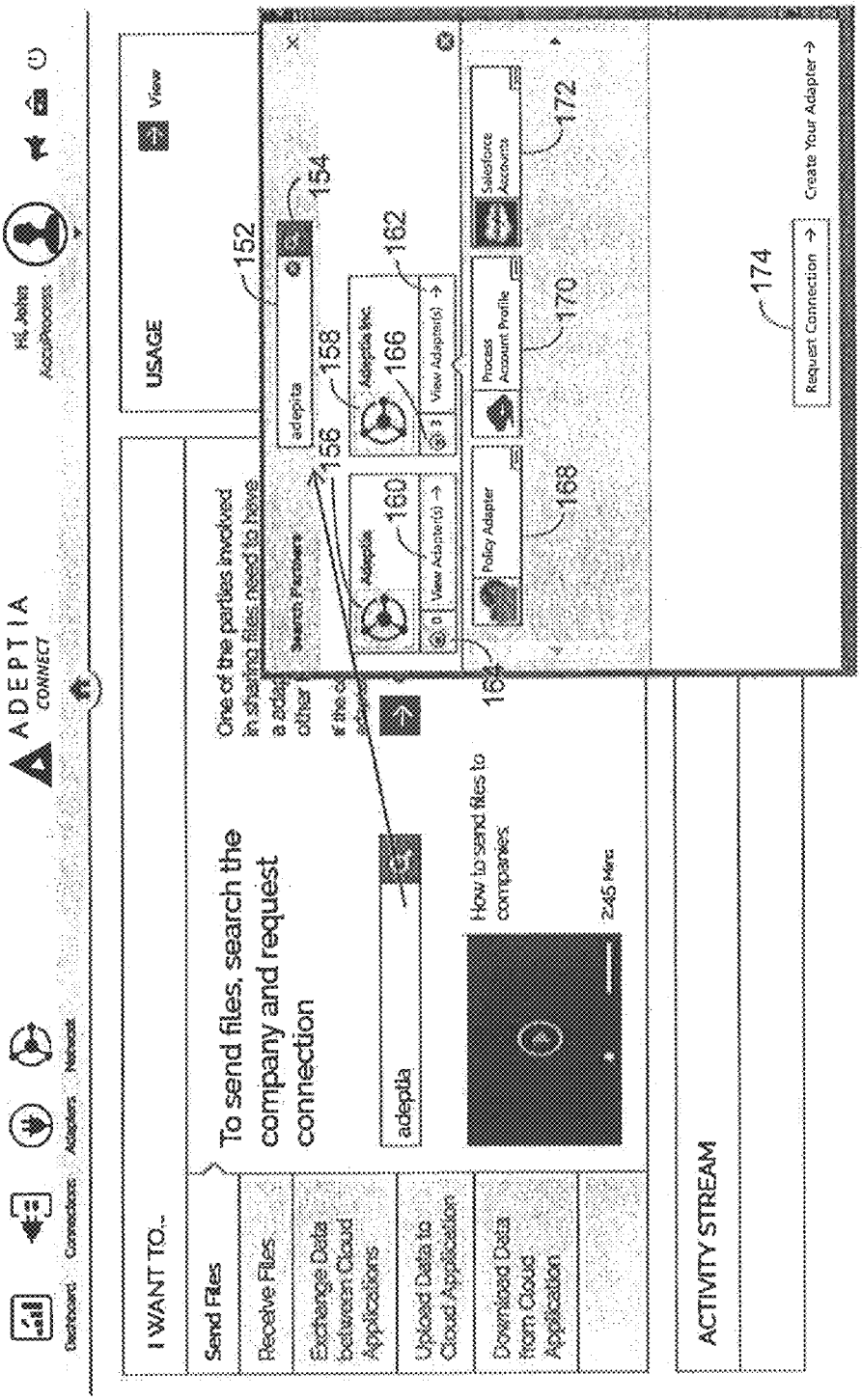
FIGS. 14-17 illustrate exemplary web pages illustrating a social network approach to requesting connectivity with a third party.

As mentioned above, FIGS. 14-17 illustrate exemplary web pages illustrating a social network approach to requesting connectivity with a third party. Referring first to FIG. 14, an adapter for a particular company may be searched by entering the name of company in the text box 152 and selecting the search icon 154. All adapters belonging to the selected company will be shown. In the example shown, the company searched has two adapters. Icons, identified with the reference numerals 156 and 158, are shown for each adapter. Below each of the icons is a text box identified as "View Adapter". Next to each text box 160 and 162 is a radio button, 164 and 166. The radio buttons allow the number of adapters located that correspond to the search term. In particular, when the radio buttons 164 and 166 are selected, the number of adapters corresponding to the search term inserted into the text box 152 is displayed. In this example, the search term was Adeptia. As shown, the number of adapters from the directory under the name Adeptia is zero. However three adapters were located for Adeptia, Inc. Icons representing those adapters are displayed, as indicated by the reference numerals when the View Adapter(s) button 162 is selected. In order to view a specific adapter, the adapter of interest is first highlighted. A mouse click over the highlighted adapter causes the selected adapter configuration to be displayed.

Figure 15:
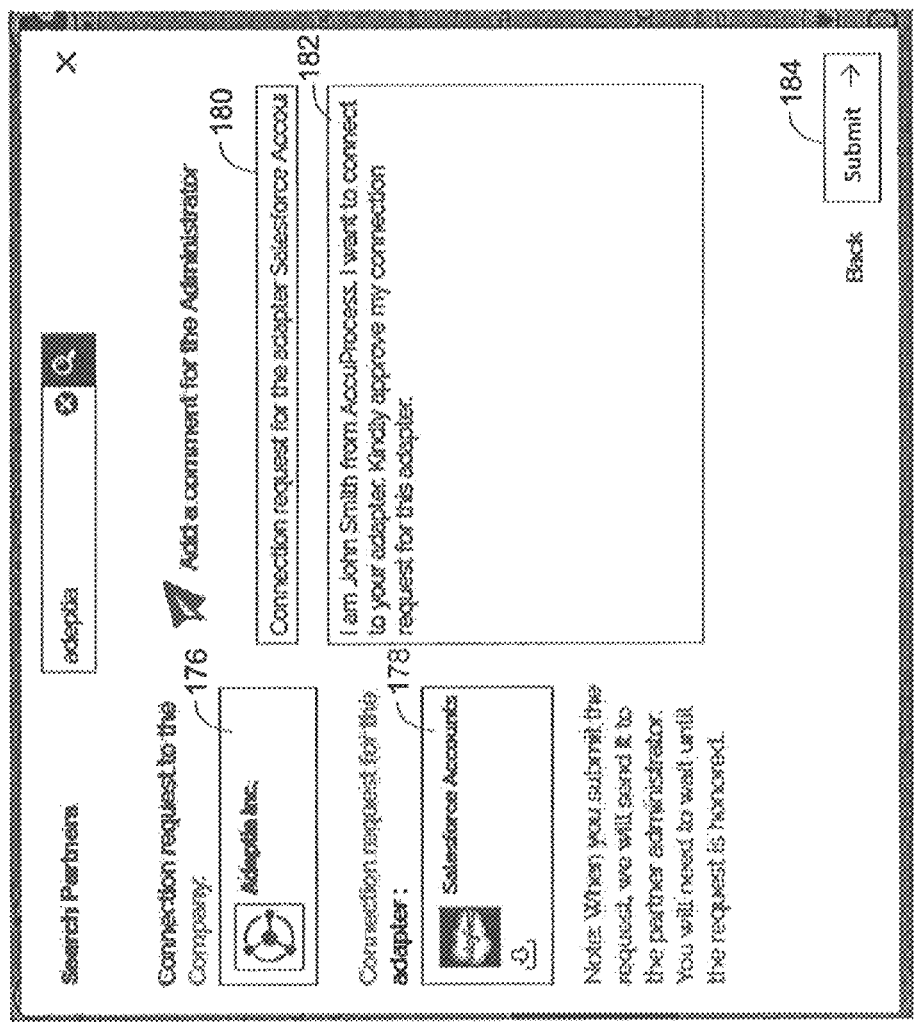

After Company B decides which adapter of Company A, i.e. Adeptia, to connect to. Company B sends a requests connection to Company A. for a particular connector by way of a "Request Connection" button 174. Selection of the "Request Connection" button 174 directs the user to the web page illustrated in FIG. 15. FIG. 15 includes a number of text boxes. The text box 176 is used to identify the company to which the connection request is made. In this example, the request is made to Adeptia. The text box 178 identifies the particular adapter for which connection is requested. In this case the adapter "Salesforce Accounts" has been selected. The text box 180 is used for comments to the administrator. In this case, the comment simply identifies the request. Lastly, the box 182 is used to provide helpful information to assist Adeptia in deciding whether to allow connection. In order to submit the request, the submit button 184 is selected and the request is sent to Company A (Adeptia).

Figure 16:
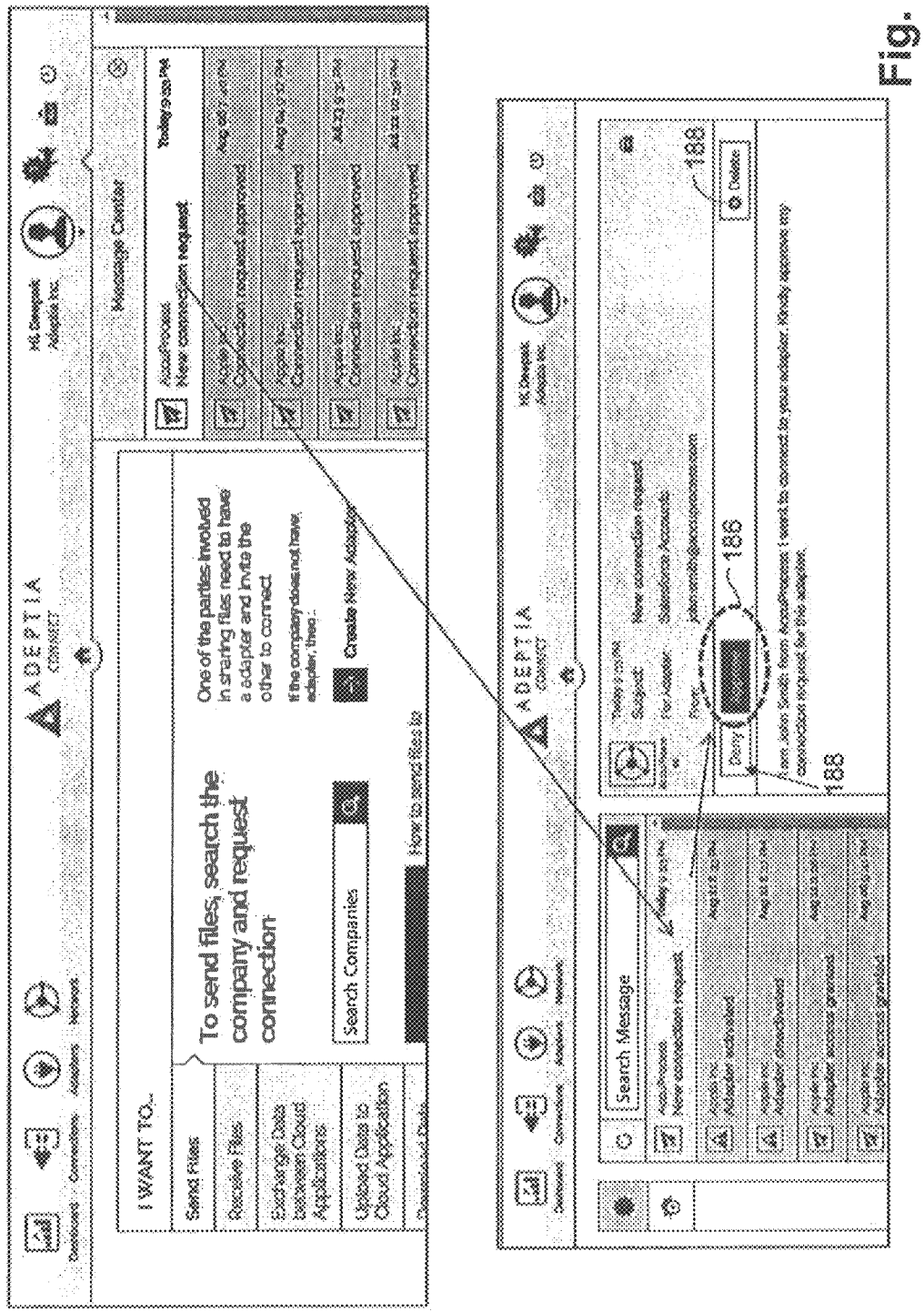

FIG. 16 illustrates a web page illustrating the request from Company B to connect to Company A. As shown, at Company A's end, a web page which includes a message center is displayed which notifies Company A of Company B's request for connection. This web page includes an "Approve" button 186 and a "Deny" button 188.

Figure 17:
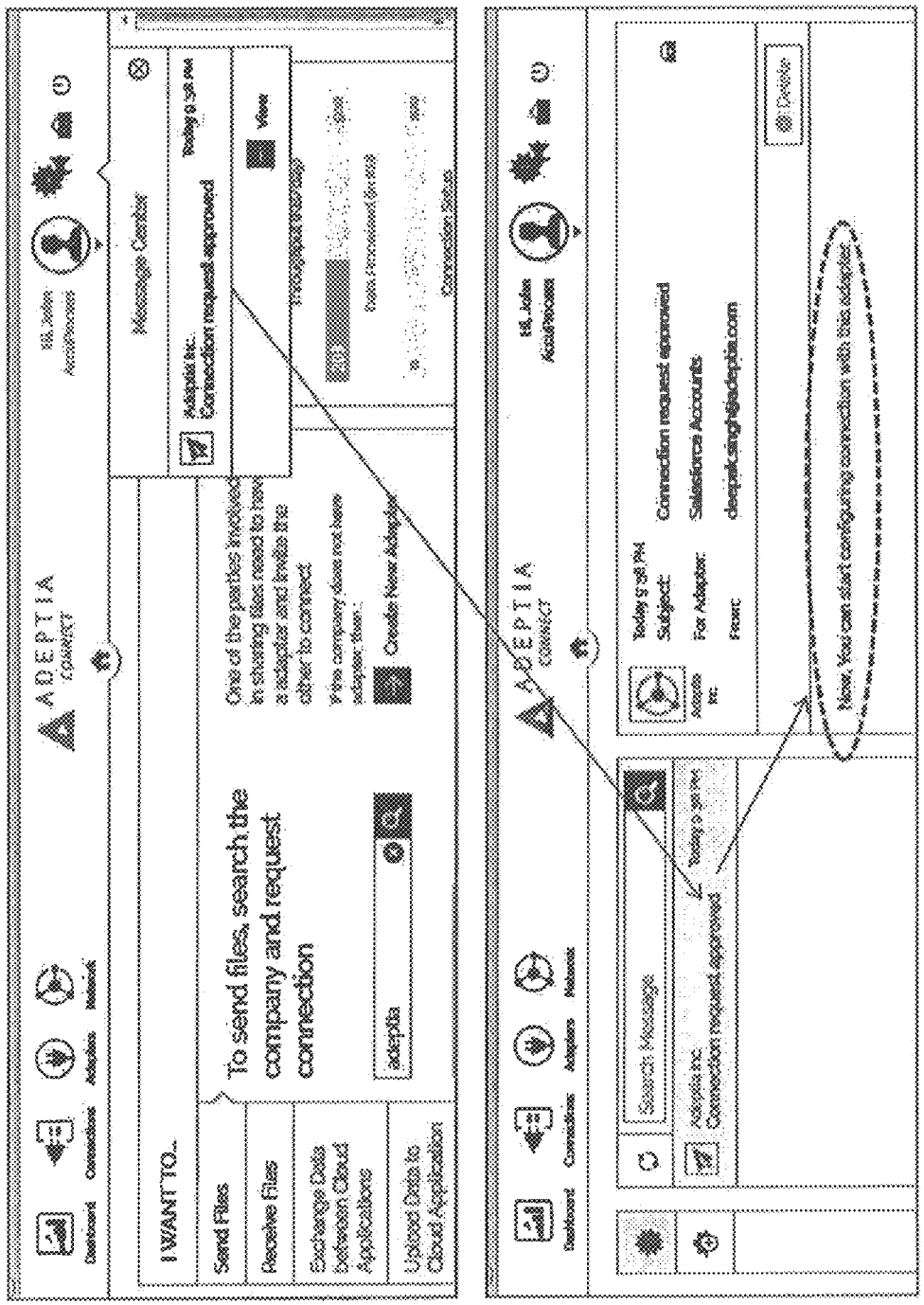

Assuming the request is approved, Company B is notified, for example, as indicated by web page illustrated in FIG. 17.

Figure 18:
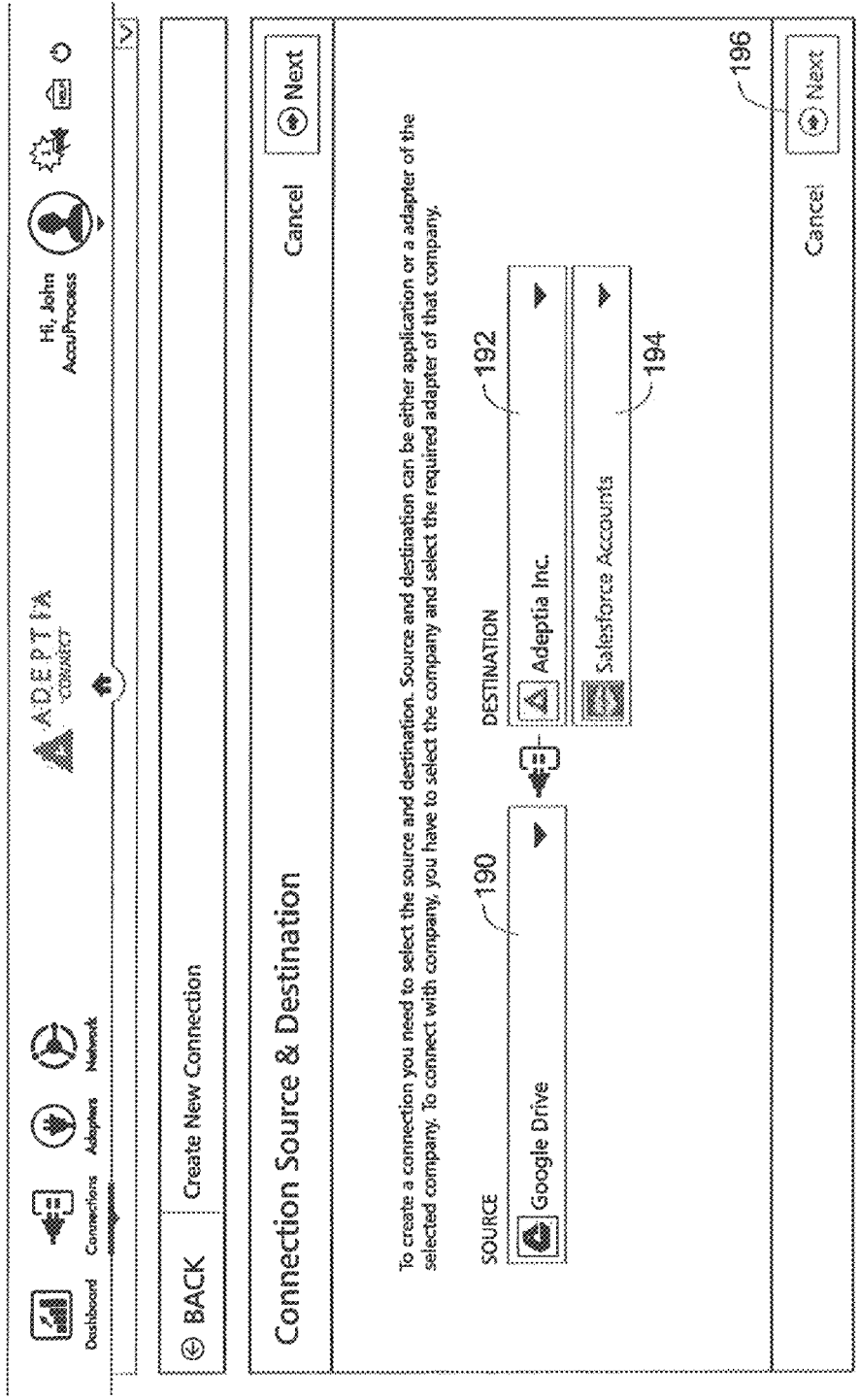

FIGS. 18-23 illustrate the process of Company B configuring a connection to connect to Company A's adapter, as discussed above. In these figures, Company B configures a connection to connect to Company A's connector. Referring first to FIG. 18, this figure illustrates a web page entitled; "Create New Connection". This web page includes three text boxes 109, 192 and 194 with drop down menus. The drop down menu 190 is the source. In this example, Company B is the source and specifically Company B's cloud application, Google Drive. This source information is provided in the text box 190. The text boxes 192 and 194 relate to the destination. In this example, the destination is Company B's adapter Salesforce Accounts.

Figure 19:
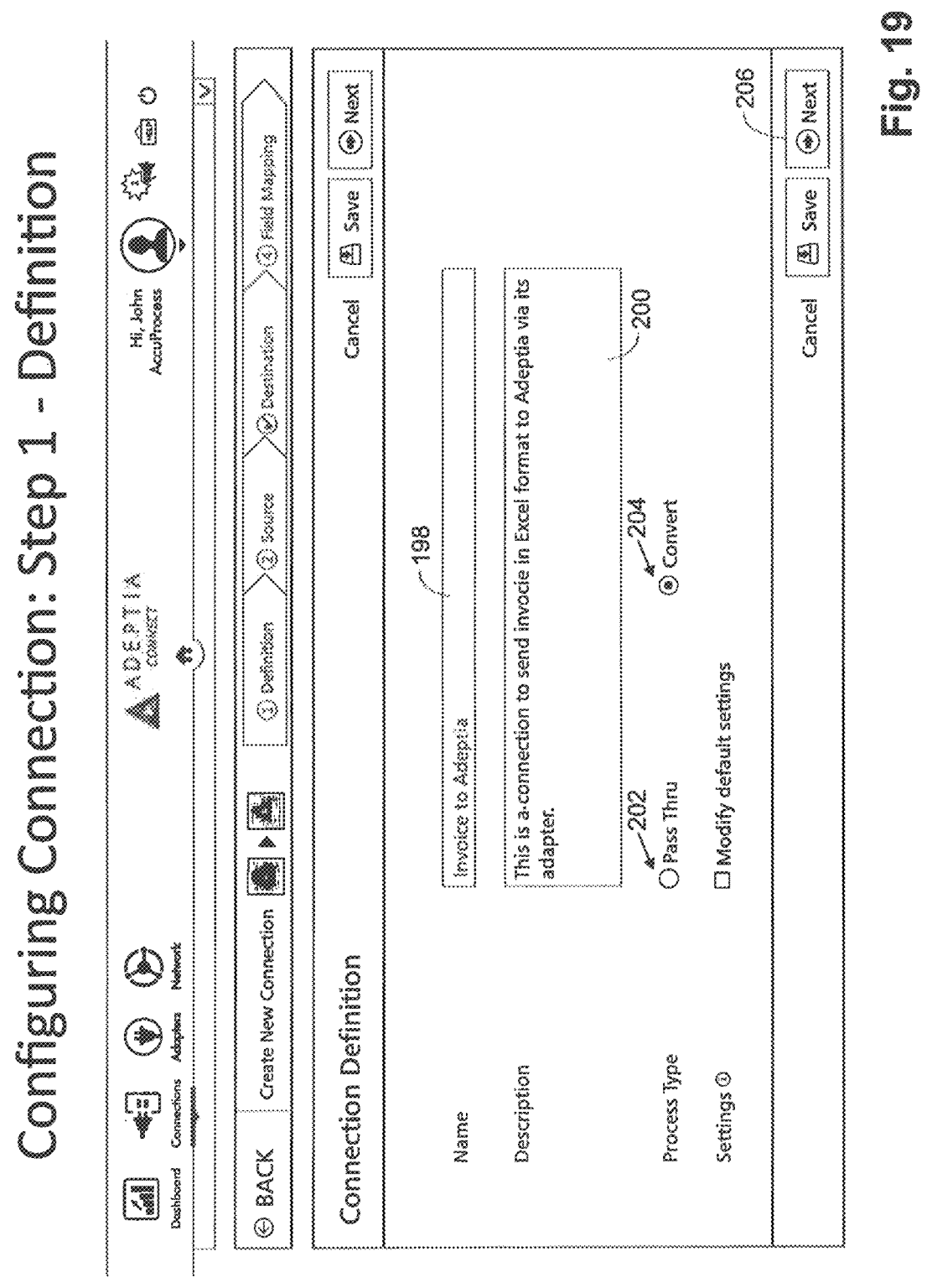

In order to proceed to the next web page, the user selects the "Next" button 196 on the bottom of the page. The next page is illustrated in FIG. 19. On this page the connection is defined. This page includes two text boxes 198 and 200. The text box 198 is used to identify the name of the file while the text box 200 is used to provide a description of the file. A pair of radio buttons 202 and 204 are provided to identify the type of processing to be performed by the interface 28 (FIG. 4). The processing is either pass thru or convert. After the definition is established the Company B user can select a "Next" button 206 to move onto the next page, illustrated in FIG. 20.

Figure 20:
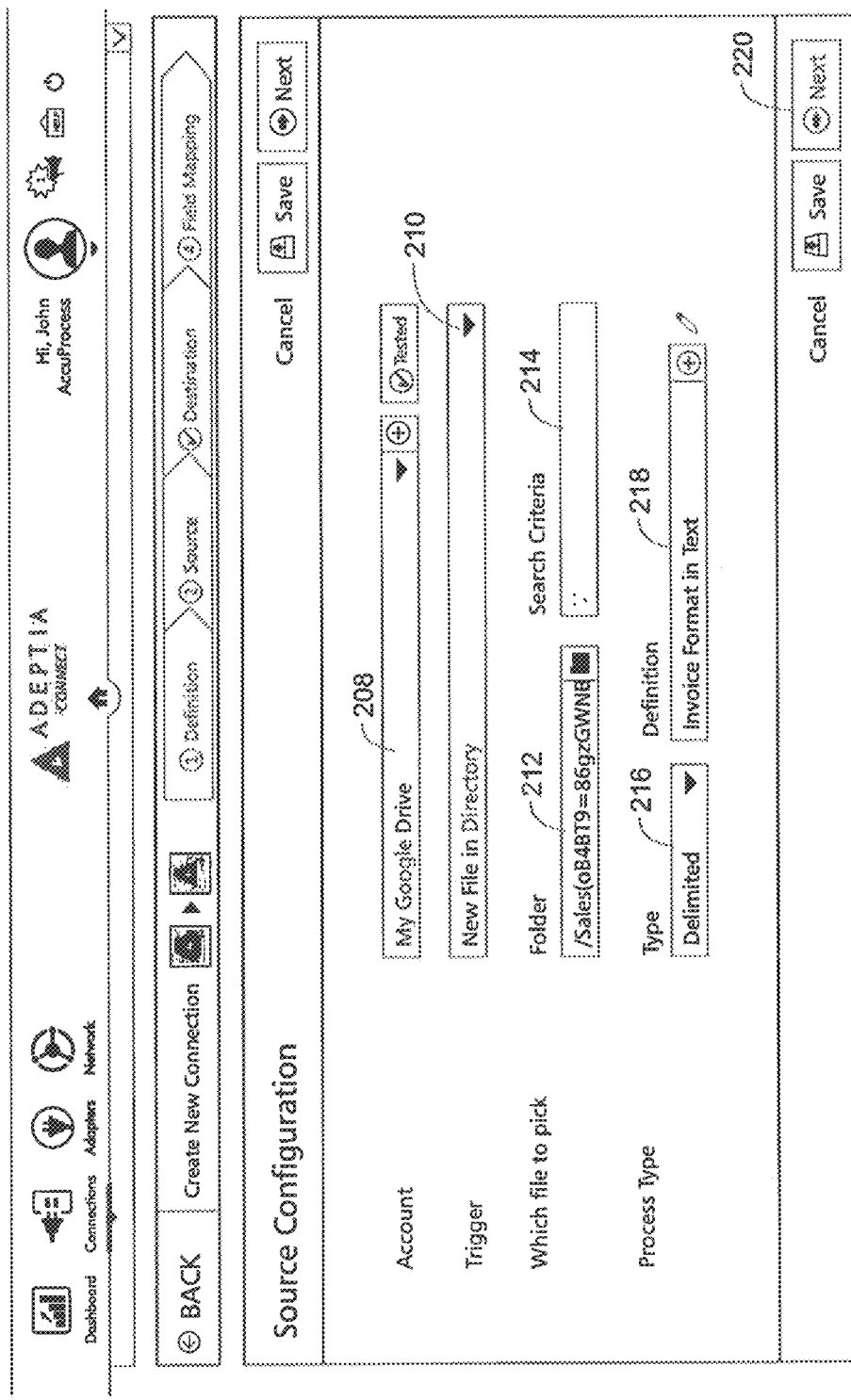

FIG. 20 is used to identify the source. This page has six text boxes; 208-218. The text box 208 identifies where Company B's file is to be picked up. In this example, the files are to be picked up from Company B's cloud space at MyGoogleDrive. The specific file location is identified in the text box 212. A text box 214 is provided for searching for files. The text box 210 identifies when the file is to picked up. In this case, the trigger is a new file in the directory. The text boxes 216 and 218 relate to the type and definition of Company B's files. More specifically, the text box 216 includes a drop down menu for identifying the type of file. In this example, the type of file is indicated as "delimited" or having a fixed length. The text box 218 is used to identify the format of the file, such as text, Excel, and XML. In this example, the file is defined as "Invoice Format in Text". When the information required by the web page illustrated in FIG. 20 is complete, the next button 220 is selected to move onto the next page, illustrated in FIG. 21.

Figure 21:
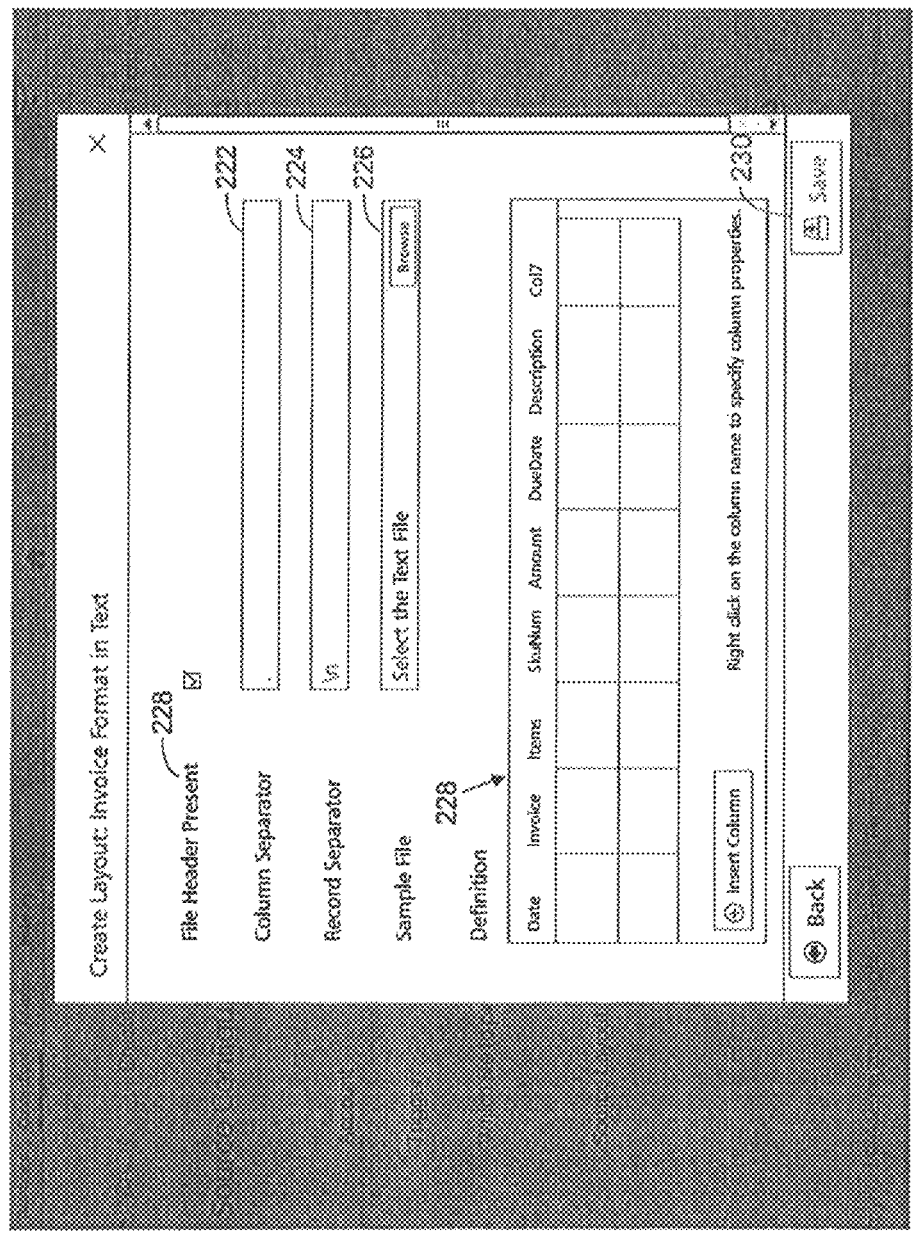

The web page illustrated in FIG. 21 only when the convert option is selected in FIG. 19. The web page illustrated in FIG. 21 is used to identify the source file layout. For example, a check box 228 is provided to identify file headers. The text boxes 222 and 224 identify the spreadsheet parameters of Company B's files. The text box 226 relates to the type of file; namely, text, XML, Excel, fixed length, etc. This web sheet includes a model spread sheet 228 in invoice format that allows columns to be added and redefined. Once the definition of the source files is completed, the user selects the Save button 230.

The next web page, illustrated in FIG. 22, is a description of the destination. Since the information on this page relates to the Company A adapter that was initially selected, the information is pre-filled. This web page includes three text boxes 232, 234 and 236. The text box 232 displays the adapter name. The text box 234 displays the company name. Lastly, the text box 236 provides an overview.

A next button 238 is provided. Selection of this button directs the user to a web page illustrated in FIG. 23. This step is only required when the "convert" feature is selected in FIG. 19. For the example shown, the field mapping rules, i.e. conversion parameters, are illustrated. The mapping rules are illustrated in the box 250. This example illustrates the field mapping rules of a source spread sheet having different relative column locations than the column locations of the target spread sheet.

The box 250 is broken down into 3 columns; 252, 254 and 256. The column 252 illustrates the location of the columns of the source spreadsheet relative to the model spread sheet illustrated in FIG. 21. The column 254 illustrates the columns in the target adapter. The third column relates to the mapping rules. As can be seen FIG. 23, the source column, identified as "items" is mapped to the Parent ID target column. Similarly, the source "SkuNum" column is mapped to the "type" target column. The source "amount" column is mapped to the is mapped to the target "name" column. Finally, the source "invoice" column is mapped to the target "Id" column.

Obviously, many modifications and variations of the present invention are possible in light of the above teachings. Thus, it is to be understood that, within the scope of the appended claims, the invention may be practiced otherwise than as specifically described above.

We claim:

1. A system for establishing electronic data communications between target businesses and their respective trading partners, each target business having at least one adapter defining its respective electronic connection parameters for establishing electronic communications with all of its respective trading partners by way of its electronic connection parameters, the system comprising:

(a) a common interface for sending and receiving data between said target businesses and their respective trading partners, said common interface, said common interface configured to enable each target business to store its electronic connection parameters in said interface to enable all of it's respective trading partners to selectively connect to said target business by way of said interface using said stored electronic connectivity parameters of said target business in said interface so that each of said target businesses need only maintain a single connection to said interface to enable point-to-point to all of its respective trading partners, said interface including a searchable directory, searchable by said trading partners;

(b) said common interface configured to enable initiation of a connection to said interface by a respective trading partner by requesting approval by way of web services to said target businesses;

(c) upon approval of said request by said target business, said common interface is further configured to create and store said trading partners electronic connection parameters that are compatible with said electronic connection parameters of said target businesses, stored in said interface, to enable point to point communications between said target businesses and all of their respective trading partners by way of a single connection to said common interface by said target businesses and their respective trading partners connected to said common interface at one time.

2. The system as recited in claim 1, wherein said directory includes the names of said target businesses connected to said interface.

3. The system as recited in claim 2, wherein said common interface is configured to receive a file layout of the respective trading partners files by way of web services.

4. The system as recited in claim 3, wherein said interface includes documentation of the file to be sent to said respective trading partners.

5. The system as recited in claim 1, wherein said predetermined electronic connectivity parameters include data protocol.

6. The system as recited in claim 1, wherein said predetermined electronic connectivity parameters include data format.

7. The system as recited in claim 1, wherein said predetermined electronic connectivity parameters include file size.

8. The system as recited in claim 1, wherein said predetermined electronic connectivity parameters include notifications.

9. The system as recited in claim 1, further including a web interface to enable said trading partners to access said common interface over the web.

* * * * *